United States Patent
Mu

(10) Patent No.: US 12,408,178 B2
(45) Date of Patent: Sep. 2, 2025

(54) DOWNLINK CONTROL CHANNEL TRANSMISSION METHOD AND APPARATUS, TERMINAL AND ACCESS NETWORK DEVICE

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 394 days.

(21) Appl. No.: 17/905,720

(22) PCT Filed: Mar. 6, 2020

(86) PCT No.: PCT/CN2020/078257
§ 371 (c)(1),
(2) Date: Sep. 6, 2022

(87) PCT Pub. No.: WO2021/174542
PCT Pub. Date: Sep. 10, 2021

(65) Prior Publication Data
US 2023/0106966 A1     Apr. 6, 2023

(51) Int. Cl.
*H04W 72/23* (2023.01)
*H04L 1/08* (2006.01)
*H04L 5/00* (2006.01)

(52) U.S. Cl.
CPC ............. *H04W 72/23* (2023.01); *H04L 1/08* (2013.01); *H04L 5/0053* (2013.01)

(58) Field of Classification Search
CPC .......... H04W 72/23; H04L 1/08; H04L 5/0053
USPC .......................................................... 370/329
See application file for complete search history.

(56) References Cited

U.S. PATENT DOCUMENTS

| | | | |
|---|---|---|---|
| 2013/0301543 A1* | 11/2013 | Eriksson | H04W 72/23 370/329 |
| 2016/0330723 A1 | 11/2016 | Gao et al. | |
| 2016/0353420 A1 | 12/2016 | You et al. | |
| 2018/0324774 A1 | 11/2018 | You et al. | |
| 2020/0022139 A1* | 1/2020 | Zhou | H04W 72/0446 |
| 2020/0022144 A1 | 1/2020 | Papasakellariou | |

(Continued)

FOREIGN PATENT DOCUMENTS

| | | |
|---|---|---|
| CN | 103929266 A | 7/2014 |
| CN | 106165508 A | 11/2016 |
| CN | 107734606 A | 2/2018 |

(Continued)

OTHER PUBLICATIONS

Extended European Search Report issued Nov. 6, 2023 in European Patent Application No. 20923670.2, 9 pages.

(Continued)

*Primary Examiner* — Hermon Asres
(74) *Attorney, Agent, or Firm* — Oblon, McClelland, Maier & Neustadt, L.L.P.

(57) ABSTRACT

A method for downlink control channel transmission method. The method can include repeatedly receiving a downlink control channel on at least one transmission unit in a transmission period of the downlink control channel, each transmission unit being used to continuously and repeatedly transmit the downlink control channel at least twice.

18 Claims, 5 Drawing Sheets

(56) References Cited

U.S. PATENT DOCUMENTS

2024/0114559 A1* 4/2024 Gold ................ H04W 74/0866

FOREIGN PATENT DOCUMENTS

| | | |
|---|---|---|
| CN | 109392113 A | 2/2019 |
| CN | 109560904 A | 4/2019 |
| CN | 109769303 A | 5/2019 |
| CN | 110536459 A | 12/2019 |
| CN | 111435870 A | 7/2020 |
| EP | 3 399 685 B1 | 12/2019 |
| WO | WO 2014/109621 A1 | 7/2014 |
| WO | WO 2015/050339 A1 | 4/2015 |
| WO | WO 2015/194917 A1 | 12/2015 |
| WO | WO-2017/167252 A1 | 10/2017 |

OTHER PUBLICATIONS

Intel Corporation, "Support of discontinuous resource mapping for NB-IoT DL," 3GPP TSG RAN WG1 NB-IoT Ad-Hoc Meeting #2, R1-161949, 2016, XP051846568, 5 pages.

Indian Office Action issued on Dec. 9, 2022 in Indian Patent Application 202227056485, 6 pages.

International Search Report mailed on Nov. 27, 2020 in PCT/CN2020/078257 filed on Mar. 6, 2020 (2 pages).

Combined Chinese Office Action and Search Report issued Mar. 5, 2024, in corresponding Chinese Patent Application No. 202080000485.8 (with English Translation and English Translation of Category of Cited Documents) 16 pages.

"Consideration on enhanced UL grant-free transmissions", Spreadtrum Communications, 3GPP TSG RAN WG1 Meeting #94 R1-1808809, Gothenburg, Sweden, Aug. 20-24, 2018, 3 pages.

Combined Chinese Office Action and Search Report issued Nov. 28, 2024 in Chinese Patent Application No. 202080000485.8 (with English translation of Office Action only and English translation of Category of Cited Documents), 6 pages.

* cited by examiner

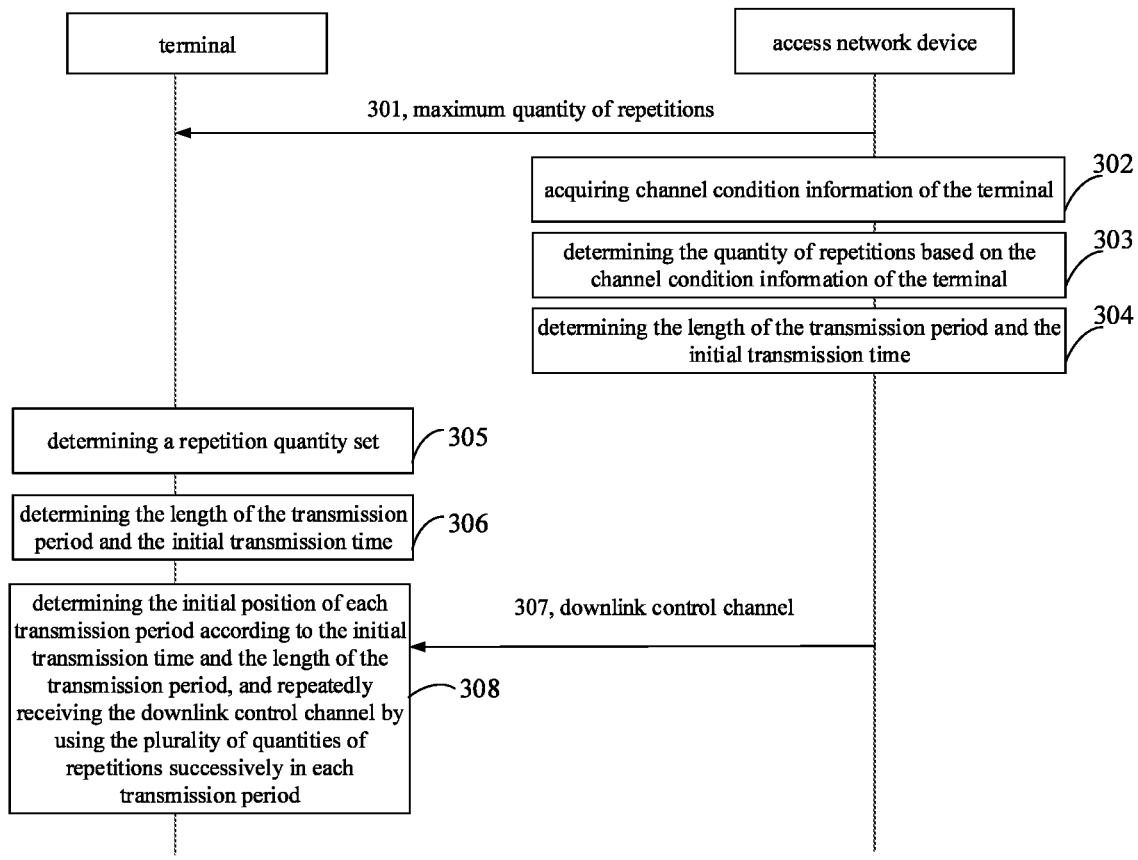
FIG. 4
FIG. 5
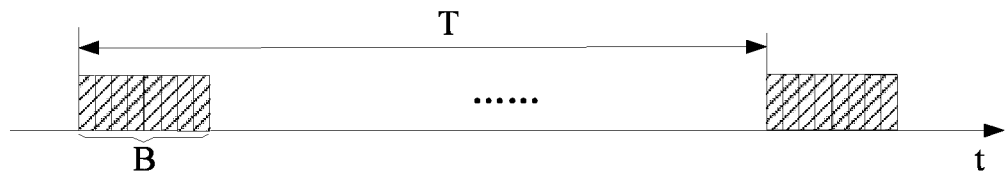
FIG. 6

DOWNLINK CONTROL CHANNEL TRANSMISSION METHOD AND APPARATUS, TERMINAL AND ACCESS NETWORK DEVICE

CROSS REFERENCE

The present application is a U.S. National Stage of International Application No. PCT/CN2020/078257, filed on Mar. 6, 2020, the contents of all of which are incorporated herein by reference in their entireties for all purposes.

BACKGROUND OF THE INVENTION

Field of the Invention

The present disclosure relates to the field of communication technologies, and in particular, to method, apparatus, terminal, and access network device for downlink control channel transmission.

Description of the Related Art

In a communication system, a downlink control channel (Physical Downlink Control Channel, PDCCH) is used to carry scheduling and other control information, which may include, for example, transmission formats, resource allocation, uplink scheduling grant, power control, and uplink retransmission information, or the like.

In the 5G New Radio (NR) system, the coverage enhancement effect can be achieved by repeatedly transmitting the PDCCH between the access network device and the terminal.

SUMMARY OF THE INVENTION

The embodiments of the present disclosure provide a downlink control channel transmission method, apparatus, terminal, and access network device.

According to a first aspect of the present disclosure, there is provided a downlink control channel transmission method, including repeatedly receiving a downlink control channel on at least one transmission unit in a transmission period of the downlink control channel, wherein each transmission unit is configured to continuously and repeatedly transmit the downlink control channel at least twice.

According to a second aspect of the present disclosure, there is provided a downlink control channel transmission method, including repeatedly sending a downlink control channel on at least one transmission unit in a transmission period of the downlink control channel, wherein each transmission unit is configured to continuously transmit the downlink control channel at least twice.

According to a third aspect of the present disclosure, there is provided a terminal, including a processor; and a memory for storing instructions executable by the processor, wherein, the processor is configured to load and execute the executable instructions to implement the downlink control channel transmission methods described above.

According to a fourth aspect of the present disclosure, there is provided an access network device, including a processor; and a memory for storing instructions executable by the processor, wherein, the processor is configured to load and execute the executable instructions to implement the downlink control channel transmission methods described above.

According to a fifth aspect of the embodiments of the present disclosure, there is provided a non-transitory computer-readable storage medium, wherein instructions in the computer-readable storage medium enable to perform the downlink control channel transmission methods described above, when executed by a processor.

It should be noted that the above general description and the following detailed description are merely exemplary and exemplary and should not be construed as limiting of the present disclosure.

BRIEF DESCRIPTION OF THE DRAWINGS

The accompanying drawings, which are incorporated in and constitute a part of this specification, illustrate embodiments consistent with the disclosure and serve to explain the principles of the disclosure together with the description.

FIG. 4 is a flowchart showing a downlink control channel transmission method according to an illustrative embodiment;

FIG. 5 is a flowchart showing a downlink control channel transmission method according to an illustrative embodiment;

FIG. 6 is a schematic diagram of a transmission position provided by an embodiment of the present disclosure;

DETAILED DESCRIPTION OF THE PREFERRED EMBODIMENTS

Illustrative embodiments will be described in detail herein, examples of which are illustrated in the accompanying drawings. Where the following description refers to the drawings, the same numerals in different drawings refer to the same or similar elements unless otherwise indicated. The implementations described in the illustrative embodiments below are not intended to represent all implementations consistent with this disclosure. Rather, they are merely examples of apparatus and methods consistent with some aspects of the present disclosure, as recited in the appended claims.

Figure 1:
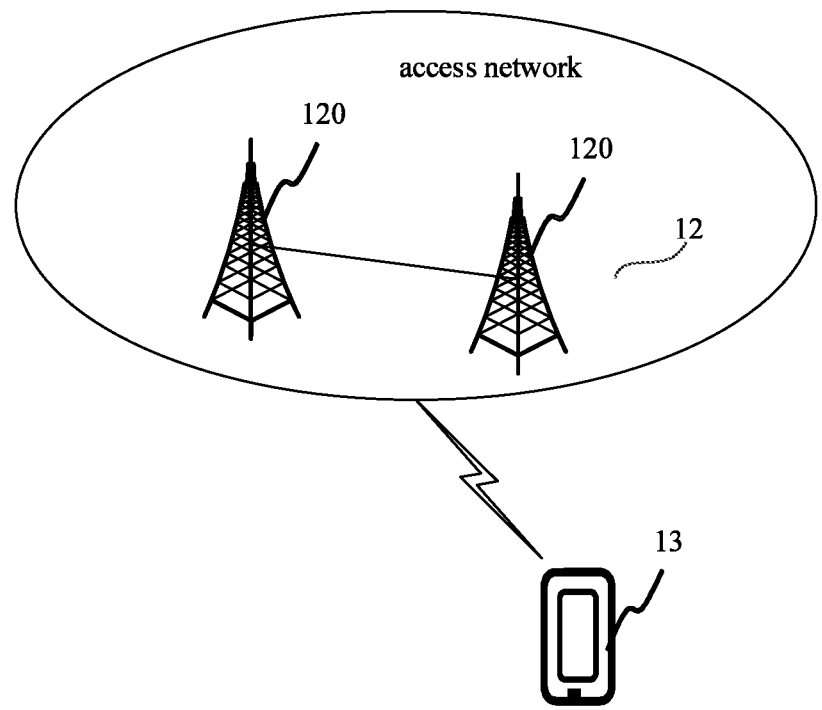
FIG. 1 is a schematic diagram of a network architecture provided by an embodiment of the present disclosure.

FIG. 1 shows a block diagram of a communication system provided by an illustrative embodiment of the present disclosure. As shown in FIG. 1, the communication system may include: an access network 12 and a terminal 13.

The access network 12 includes several access network devices 120. The access network device 120 may be a base station, and a base station is a device deployed in an access network to provide a wireless communication function for a terminal. The base station may include various forms of macro base station, micro base station, relay station, access point and so on. In systems using different wireless access technologies, the names of devices with base station functions may be different. In 5G New Radio (NR) systems, they are called gNodeBs or gNBs. With the evolution of communication technology, the description of the name "base station" may change. For the convenience of description, the above apparatuses for providing wireless communication functions for terminals are collectively referred to as access network devices hereinafter.

The terminal 13 may include various handheld devices with wireless communication functions, vehicle-mounted devices, wearable devices, computing devices or other processing devices connected to the wireless modem, as well as various forms of user devices, mobile stations (MS), terminals and so on. For the convenience of description, the devices mentioned above are collectively referred to as terminals. The access network device 120 and the terminal 13 communicate with each other through certain air interface technology, such as a Uu interface.

In the NR system, in order to save power, the access network device 120 does not send a downlink control channel to the terminal 13 in every slot. A downlink control channel (Physical Downlink Control Channel, PDCCH) is only sent to the terminal at a predetermined moment. When the access network device 120 sends the downlink control channel to the terminal 13, it is usually determined by several parameters, which will be described below with reference to FIG. 2.

The length of the transmission period (T in FIG. 2) is used to indicate the terminal starts to monitor and transmit PDCCH every how many slots. A in FIG. 2 represents a slot.

Figure 2:
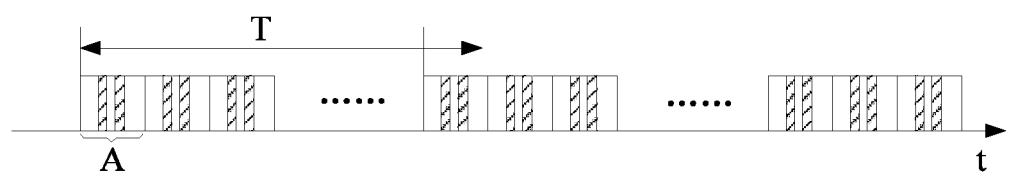
FIG. 2 is a schematic diagram of a transmission position provided by an embodiment of the present disclosure.

The number of slots lasted for every transmission means when the terminal starts the PDCCH monitoring, how many slots need to be continuously monitored, for example, 3 in FIG. 2.

The symbol position used for transmission in the slot means there are a plurality of symbols in a slot, on which symbols the terminal needs to monitor the PDCCH. For example, the shadow in FIG. 2 corresponds to the slot for transmitting the PDCCH.

It should be noted that a shaded rectangle in FIG. 2 represents one transmission of PDCCH, which may correspond to 1 to 3 slots. That is, in the current NR system, a shaded rectangle in FIG. 2 is an opportunity for transmitting PDCCH. Different PDCCHs or the same PDCCH may be transmitted in different transmission opportunities.

The effect of coverage enhancement can be achieved through repeated transmission between the access network device and the terminal. However, this discrete configuration (i.e., any two adjacent PDCCHs using non-adjacent symbols) will lengthen the receiving time of the terminal, which is not conducive to power saving. At the same time, due to the long transmission time, the possibility of the channel condition change is high, resulting in a relatively large channel difference for transmitting the same PDCCH, which is not conducive to the demodulation of the PDCCH.

The communication systems and service scenarios described in the embodiments of the present disclosure are for the purpose of illustrating the technical solutions of the embodiments of the present disclosure more clearly, and do not constitute a limitation on the technical solutions provided by the embodiments of the present disclosure. Those of ordinary skill in the art know that with the evolution of communication systems and the emergence of new service scenarios, the technical solutions provided by the embodiments of the present disclosure are also applicable to similar technical problems.

Figure 3:
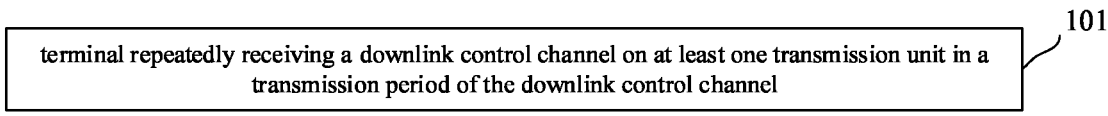
FIG. 3 is a flowchart showing a downlink control channel transmission method according to an illustrative embodiment.

FIG. 3 is a flowchart showing a downlink control channel transmission method according to an illustrative embodiment. Referring to FIG. 3, the method includes following steps.

In step 101, the terminal repeatedly receives a downlink control channel on at least one transmission unit in a transmission period of the downlink control channel. In the embodiment, each transmission unit is configured to continuously and repeatedly transmit the downlink control channel at least twice. In an embodiment of the present disclosure, one transmission unit may include a plurality of slots.

In the embodiment of the present disclosure, when the repeated transmission of the downlink control channel is performed in each transmission period, the downlink control channel is carried on at least one transmission unit, and each transmission unit is used to continuously and repeatedly transmit the downlink control channel for at least twice. In this way, at least part of the downlink control channels is continuously transmitted, which avoids the scattered arrangement of downlink control channels in the related art, saves transmission time, and reduces power consumption. At the same time, the channel difference of repeated transmission is reduced by shortening the transmission time, to facilitate the demodulation processing of the terminal, such that the transmission performance can be improved under the condition of enhanced coverage.

Optionally, repeatedly receiving a downlink control channel on at least one transmission unit in a transmission period of the downlink control channel can include determining a repetition quantity set, wherein the repetition quantity set includes a plurality of different quantities of repetitions, and a quantity of repeatedly transmitting the downlink control channel on the at least one transmission unit is one quantity in the repetition quantity set, in each transmission period, repeatedly receiving the downlink control channel by using the plurality of quantities of repetitions successively from an initial transmission time, until the downlink control channel is correctly demodulated or all quantities of repetitions in the repetition quantity set are traversed.

In this implementation, the terminal selects a plurality of quantities of repetitions from the repetition quantity set and performs demodulation processing in sequence, until the downlink control channel is correctly demodulated or all quantities of repetitions in the repetition quantity set are traversed. This solution does not need the access network device to send the actual quantity of repetitions to the terminal, which saves signaling overhead and reduces system power consumption.

Optionally, when a number of the transmission units is greater than 1, an interval length between any adjacent transmission units is identical, the method further includes determining a length of the transmission unit and the interval length.

In this implementation, in a transmission period, if the number of transmission units is greater than 1, the terminal also needs to determine the length of the transmission unit and the interval length first, and then receive the downlink control channel according to the determined length of the transmission unit and the interval length.

Optionally, determining the length of the transmission unit includes acquiring a configuration signaling sent by an access network device, wherein the configuration signaling includes the length of the transmission unit, or, acquiring the length of the transmission unit configured in a protocol, or, determining the length of the transmission unit based on a relationship between a maximum quantity of repetitions and a threshold, wherein the maximum quantity of repetitions is a maximum quantity of repetitions of the downlink control channel in each transmission period, or, determining the length of the transmission unit based on a quantity of repetitions used in a current transmission.

In this implementation, the length of the transmission unit may be configured to the terminal through the access network device, or may be obtained by the terminal itself from a protocol, or determined based on the maximum quantity of repetitions.

Optionally, determining the interval length includes acquiring a configuration signaling sent by an access network device, wherein the configuration signaling includes the interval length, or, acquiring the interval length configured in a protocol, or, determining the interval length based on the length of the transmission unit, or, determining the interval length based on a maximum quantity of repetitions, wherein the maximum quantity of repetitions is a maximum quantity of repetitions of the downlink control channel in each transmission period.

In this implementation, the length of the transmission unit may be configured to the terminal through the access network device, or may be obtained by the terminal itself from a protocol, or determined based on the maximum quantity of repetitions.

Optionally, the method further includes determining a length of the transmission period, periodically receiving the downlink control channel based on the length of the transmission period.

In this implementation, the terminal implements periodic transmission of the downlink control channel with the access network device by determining the length of the transmission period.

Optionally, determining the length of the transmission period includes determining the length of the transmission period based on at least one of a length of the transmission unit, the interval length, and the maximum quantity of repetitions, wherein the maximum quantity of repetitions is a maximum quantity of repetitions of the downlink control channel in each transmission period.

In this implementation, the terminal determines the length of the transmission period through at least one of a length of the transmission unit, the interval length, and the maximum quantity of repetitions. This solution does not need the access network device to send the length of the transmission period to the terminal, which saves signaling overhead and reduces system power consumption.

Optionally, the method further includes determining an initial transmission time;
  in each transmission period, receiving the downlink control channel from the initial transmission time.

In this implementation, the terminal implements correct transmission of the downlink control channel with the access network device by determining the initial transmission time.

Optionally, determining the initial transmission time includes determining the initial transmission time based on at least one of a length of the transmission unit, the interval length, and the maximum quantity of repetitions, wherein the maximum quantity of repetitions is a maximum quantity of repetitions of the downlink control channel in each transmission period.

In this implementation, the terminal determines the initial transmission time based on at least one of a length of the transmission unit, the interval length, and the maximum quantity of repetitions. This solution does not need the access network device to send the initial transmission time to the terminal, which saves signaling overhead, and reduces system power consumption.

Optionally, determining the repetition quantity set includes acquiring a maximum quantity of repetitions, wherein the maximum quantity of repetitions is a maximum quantity of repetitions of the downlink control channel in each transmission period, determining the repetition quantity set based on the maximum quantity of repetitions, wherein a maximum value in the repetition quantity set is the maximum quantity of repetitions.

In this implementation, the repetition quantity set may be determined based on the maximum quantity of repetitions, such that the terminal can perform demodulation of the downlink control channel subsequently based on the repetition quantity set.

Optionally, acquiring the maximum quantity of repetitions includes receiving a radio resource control (RRC) signaling, wherein the radio resource control signaling includes the maximum quantity of repetitions.

In this implementation, the maximum quantity of repetitions is limited to be transmitted by radio resource control signaling. Since the maximum quantity of repetitions does not change frequently, it can be generally used as a static parameter after configuration, while the quantity of repetitions actually used between the access network device and the terminal will change dynamically with the channel quality of the terminal. Therefore, by transmitting only the maximum quantity of repetitions through signaling without transmitting the quantity of repetitions actually used each time, signaling overhead can be reduced.

It should be noted that the foregoing step 101 may be combined arbitrarily with the foregoing optional steps.

FIG. 4 is a flowchart showing a downlink control channel transmission method according to an illustrative embodiment. Referring to FIG. 4, the method includes following steps.

In step 201, the access network device repeatedly sends a downlink control channel on at least one transmission unit in each transmission period of the downlink control channel. In the embodiment, each transmission unit is configured to continuously and repeatedly transmit the downlink control channel at least twice. In an embodiment of the present disclosure, one transmission unit may include a plurality of slots.

In the embodiment of the present disclosure, when the repeated transmission of the downlink control channel is performed in each transmission period, the downlink control channel is carried on at least one transmission unit, and each transmission unit is used to continuously and repeatedly transmit the downlink control channel for at least twice. In this way, at least part of the downlink control channels is continuously transmitted, which avoids the scattered arrangement of downlink control channels in the related art, saves transmission time, and reduces power consumption. At the same time, the channel difference of repeated transmission is reduced by shortening the transmission time, to facilitate the demodulation processing of the terminal, such that the transmission performance can be improved under the condition of enhanced coverage.

Optionally, repeatedly sending a downlink control channel on at least one transmission unit in a transmission period of the downlink control channel includes acquiring channel condition information of a terminal, determining a quantity of repetitions based on channel condition information of the terminal, repeatedly sending the downlink control channel based on the quantity of repetitions, wherein a quantity of repeatedly transmitting the downlink control channel on the at least one transmission unit is the quantity of repetitions.

Optionally, when a number of the transmission units is greater than 1, an interval length between any adjacent transmission units is identical, the method further includes determining a length of the transmission unit and the interval length.

Optionally, determining the length of the transmission unit includes acquiring the length of the transmission unit configured in a protocol, or determining the length of the transmission unit based on a relationship between a maximum quantity of repetitions and a threshold, wherein the maximum quantity of repetitions is a maximum quantity of repetitions of the downlink control channel in each transmission period, or determining the length of the transmission unit based on a quantity of repetitions used in a current transmission.

Optionally, determining the interval length includes acquiring the interval length configured in a protocol, or determining the interval length based on the length of the transmission unit, or determining the interval length based on a maximum quantity of repetitions, wherein the maximum quantity of repetitions is a maximum quantity of repetitions of the downlink control channel in each transmission period.

Optionally, the method further includes sending at least one of the length of the transmission unit and the interval length by using a configuration signaling.

Optionally, the method further includes determining a length of the transmission period, periodically sending the downlink control channel based on the length of the transmission period.

Optionally, determining the length of the transmission period includes determining the length of the transmission period based on at least one of a length of the transmission unit, the interval length, and the maximum quantity of repetitions, wherein the maximum quantity of repetitions is a maximum quantity of repetitions of the downlink control channel in each transmission period.

Optionally, the method further includes determining an initial transmission time, in each transmission period, sending the downlink control channel from the initial transmission time.

Optionally, determining the initial transmission time includes determining the initial transmission time based on at least one of a length of the transmission unit, the interval length, and the maximum quantity of repetitions, wherein the maximum quantity of repetitions is a maximum quantity of repetitions of the downlink control channel in each transmission period.

Optionally, the method further includes sending a radio resource control signaling, wherein the radio resource control signaling includes a maximum quantity of repetitions, the maximum quantity of repetitions is a maximum quantity of repetitions of the downlink control channel in each transmission period.

It should be noted that the foregoing step 201 may be combined arbitrarily with the foregoing optional steps.

FIG. 5 is a flowchart showing a downlink control channel transmission method according to an illustrative embodiment. Referring to FIG. 5, the method includes following steps.

In step 301, the access network device sends the maximum quantity of repetitions to the terminal, wherein the maximum quantity of repetitions is a maximum quantity of repetitions of the downlink control channel in each transmission period; the terminal receives the maximum quantity of repetitions sent by the access network device.

In this step, the access network device may configure the maximum quantity of repetitions to the terminal by configuring parameters. For example, the access network device sends the radio resource control signaling to the terminal, and the radio resource control signaling includes the maximum quantity of repetitions. The terminal receives the radio resource control signaling sent by the access network device.

In this embodiment of the present disclosure, the maximum quantity of repetitions may be preconfigured in an access network device, for example, configured in a protocol.

In step 302, the access network device acquires channel condition information of the terminal.

The channel condition information is used to indicate the channel quality of the terminal. Generally, the channel quality is related to the location of the terminal. For example, the channel quality when the terminal is in the center of the cell is higher than that when the terminal is at the edge of the cell. The terminal can report the channel condition information to the access network device through a message.

In step 303, the access network device determines the quantity of repetitions based on the channel condition information of the terminal.

The quantity of repetitions refers to the number of times of repeatedly transmitting the downlink control channel. The effect of coverage enhancement may be achieved by the terminal repeatedly transmitting the downlink control channel. Therefore, the better the channel quality is, the less the quantity of repetitions can be, and the worse the channel quality is, the more the quantity of repetitions can be. That is, the channel quality is negatively correlated with the quantity of repetitions.

In an embodiment of the present disclosure, a repetition quantity set may be determined based on the maximum quantity of repetitions. For example, if the maximum quantity of repetitions is Rmax, the repetition quantity set may be {⅛Rmax, ¼Rmax, ½Rmax, Rmax}. When the access network device determines the quantity of repetitions based on the channel condition information of the terminal, it selects from the repetition quantity set. For example, when the channel quality is good, the quantity of repetitions can be selected as ⅛Rmax or ¼Rmax. When the channel quality is bad, the quantity of repetitions can be selected as ½Rmax or Rmax.

The repetition quantity set herein is an example. In other implementations, the repetition quantity set may also include more or less values, or include different values, and the like.

In step 304, the access network device determines the length of the transmission period and the initial transmission time.

In an embodiment of the present disclosure, the access network device may determine the length of the transmission period based on the maximum quantity of repetitions. For example, the length T of the transmission period can be calculated according to the maximum quantity of repetitions Rmax, for example, T=A*Rmax. In the embodiment, A may be specified in the access network device protocol, where A may be a positive integer. By setting the length of the transmission period as A times Rmax, in such a period, in addition to resources of transmitting the terminal, other slots are also integer multiples of Rmax, so that the slot can be fully utilized by other terminals, without generating fragmented resources. Similarly, the access network device can configure the parameter A to the terminal by configuring the parameter, so that the terminal can calculate the length T of the transmission period in the same way.

In an embodiment of the present disclosure, the access network device may determine the initial transmission time based on the maximum quantity of repetitions. For example, the initial transmission time X may be calculated according to the maximum quantity of repetitions Rmax, for example, X mod (A*Rmax)=a. In the embodiment, a may be specified in the access network device protocol. Similarly, the access network device can configure the parameter a to the terminal by configuring the parameter, so that the terminal can calculate the initial transmission time X in the same way.

The calculated initial transmission time X herein may be a sub-frame, a slot or a symbol. For example, the calculated initial transmission time is the Xth slot, the positions of the symbol and the sub-frame may be determined by a predetermined value or other manners. The position determined by the predetermined value or other manners can be sent by the access network device to the terminal through signaling, such as the radio resource control signaling.

In step 305, the terminal determines a repetition quantity set, where the repetition quantity set includes a plurality of different quantities of repetitions.

As before, the repetition quantity set may be {⅛Rmax, ¼Rmax, ½Rmax, Rmax}. After receiving the Rmax sent by the access network device, the terminal may obtain each value of the repetition quantity set.

In step 306, the terminal determines the length of the transmission period and the initial transmission time.

In this implementation, similar to the access network device, the terminal determines the length of the transmission period and the initial transmission time by itself, instead of being sent by the access network device, which can save signaling overhead and reduce system power consumption.

In the process that the terminal determines the length of the transmission period and the initial transmission time, the parameter A and the parameter a can be obtained from the protocol, or can be configured to the terminal by the access network device together with the maximum quantity of repetitions Rmax.

In step 307, the access network device determines the initial position of each transmission period according to the initial transmission time and the length of the transmission period, and repeatedly sends the downlink control channel according to the quantity of repetitions in each transmission period.

In this implementation, each period includes one transmission unit, and the quantity of repeatedly transmitting the downlink control channel by the transmission unit is the quantity of repetitions. Alternatively, each period includes more than two transmission units. These transmission units are consecutive in the time domain, and the quantity of repeatedly transmitting the downlink control channel by the more than two transmission units is the quantity of repetitions.

FIG. 6 is a schematic diagram of a transmission position provided by an embodiment of the present disclosure. Referring to FIG. 6, in each transmission period T, the resources used to transmit the downlink control channel are continuous, and these resources constitute the transmission unit B, i.e., the shaded rectangle in the figure. Each shaded rectangle represents one transmission of the downlink control channel. In this case, the access network device may not determine the length of the transmission unit. The access network device may also determine the length of the transmission unit based on the quantity of repetitions in the current transmission period. For example, the length of the transmission unit may be set as the actual quantity of repetitions determined for the current transmission. That is, in a certain transmission, the determined actual quantity of repetitions is X, and then the length of the transmission unit can be set as X.

In other embodiments, the resource corresponding to B in FIG. 6 may also include more than two consecutive transmission units.

Step 308, the terminal determines the initial position of each transmission period according to the initial transmission time and the length of the transmission period, and repeatedly receives the downlink control channel by using the plurality of quantities of repetitions successively in each transmission period, until the downlink control channel is correctly demodulated or all quantities of repetitions in the repetition quantity set are traversed.

For example, the terminal may perform repeated reception and demodulation by sequentially taking values from the repetition quantity set {⅛Rmax, ¼Rmax, ½Rmax, Rmax}. For example, in the transmission period, the downlink control channel is repeatedly received from the initial transmission time, and then the quantities in the repetition quantity set are demodulated according to a manner from small to large, until the downlink control channel is correctly demodulated or all quantities of repetitions in the repetition quantity set are traversed. The manner of taking values may also be from large to small, or in a random order, in addition to the manner of from small to large.

In this implementation, the quantity of repetitions is determined by the terminal itself, instead of being sent by the access network device, which can save signaling overhead and reduce system power consumption.

In the method flowchart shown in FIG. 5, each transmission period includes only one transmission unit or includes more than two consecutive transmission units. The case where each transmission period includes more than two transmission units arranged at intervals will be described below with reference to FIG. 6. The interval length between any adjacent transmission units is the same.

Figure 7:
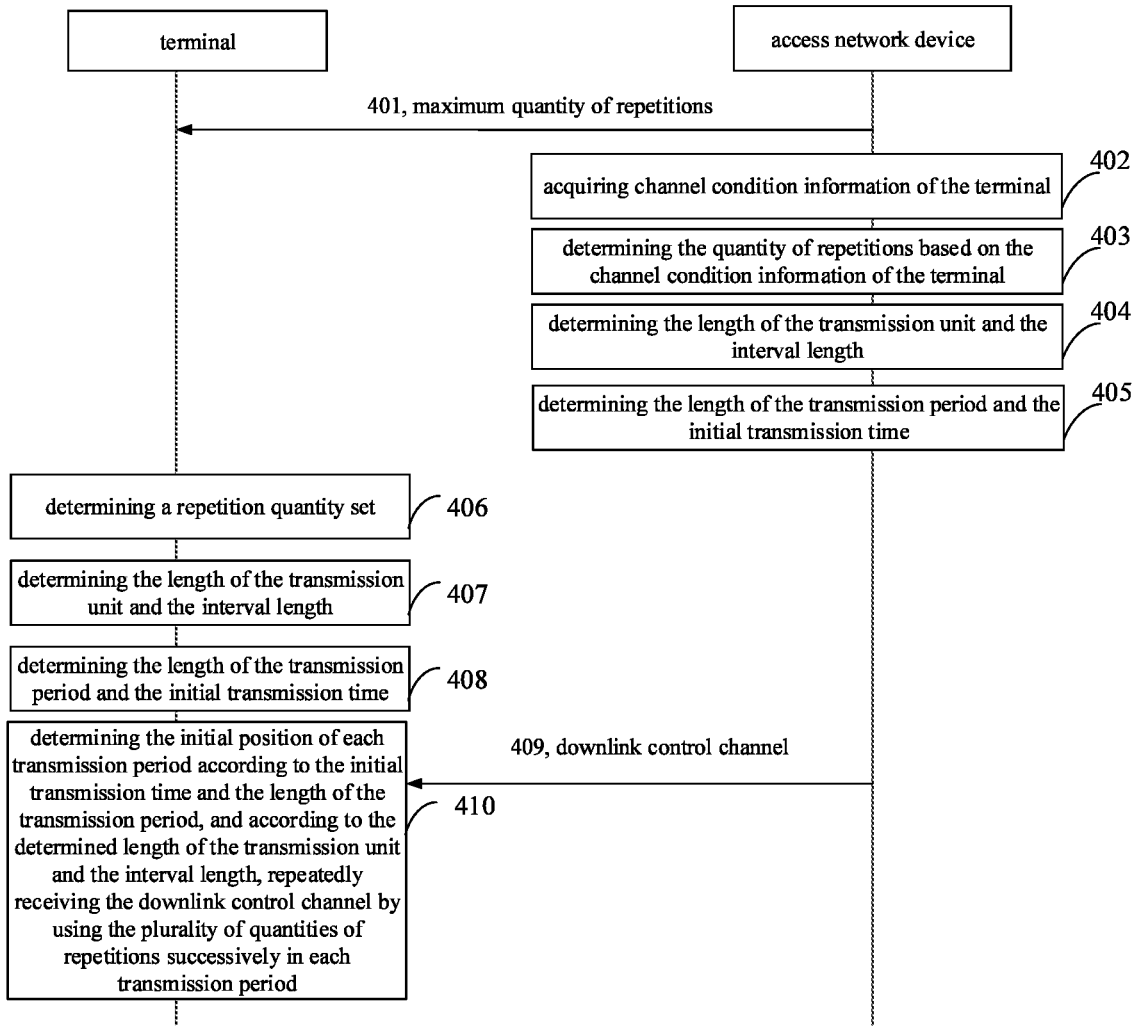
FIG. 7 is a flowchart showing a downlink control channel transmission method according to an illustrative embodiment.

FIG. 7 is a flowchart showing a downlink control channel transmission method according to an illustrative embodiment. Referring to FIG. 7, the method includes the following steps.

In step 401, the access network device sends the maximum quantity of repetitions to the terminal, wherein the maximum quantity of repetitions is a maximum quantity of repetitions of the downlink control channel in each transmission period; the terminal receives the maximum quantity of repetitions sent by the access network device.

The detailed process of this step is the same as that of step 301.

In step 402, the access network device acquires channel condition information of the terminal.

The detailed process of this step is the same as that of step 302.

In step 403, the access network device determines the quantity of repetitions based on the channel condition information of the terminal.

The detailed process of this step is the same as that of step 303.

In step 404, the access network device determines the length of the transmission unit and the interval length.

In this embodiment of the present disclosure, the access network device may acquire the length of the transmission unit configured in the protocol;

or, determine the length of the transmission unit based on a relationship between a maximum quantity of repetitions and a threshold. The maximum quantity of repetitions is a maximum quantity of repetitions of the downlink control channel in each transmission period.

For example, the length of the transmission unit can be determined based on Table 1 below.

TABLE 1

| maximum quantity of repetitions | length of the transmission unit |
|---|---|
| >M | 8 |
| <=M | 4 |

In the embodiment, M may be specified in the access network device protocol. Similarly, the access network device can configure the parameter M to the terminal by configuring the parameter, so that the terminal can determine the length of the transmission unit in the same way.

Table 1 is only an example. In fact, the maximum quantity of repetitions may also be divided into more levels, so as to correspond to more lengths of the transmission unit.

Alternatively, the length of the transmission unit is determined based on the quantity of repetitions used in the current transmission.

For example, the access network device selects an appropriate length of the transmission unit based on the value of the quantity of repetitions. For example, the number of transmission units is a set value, and the length of the transmission unit can be determined based on the quantity of repetitions and the set value.

In an embodiment of the present disclosure, the access network device may obtain the interval length configured in the protocol, or determine the interval length based on the length of the transmission unit, or determine the interval length based on a maximum quantity of repetitions, wherein the maximum quantity of repetitions is a maximum quantity of repetitions of the downlink control channel in each transmission period.

For example, there may be a corresponding relationship between the interval length and the length of the transmission unit, or there may be a corresponding relationship between the interval length and the maximum quantity of repetitions. The corresponding relationship may be specified in the access network device protocol. Similarly, the access network device can configure the above corresponding relationship to the terminal, so that the terminal can determine the interval length in the same way.

In step 405, the access network device determines the length of the transmission period and the initial transmission time.

In an implementation of the embodiment of the present disclosure, the access network device may determine the length of the transmission period and the initial transmission time in the same manner as in step 304.

In another implementation of the embodiment of the present disclosure, the access network device may further determine the length of the transmission period based on the length of the transmission unit, or based on the interval length, or based on two of the maximum quantity of repetitions, the length of the transmission unit and the interval length.

Similarly, the access network device may also determine the initial transmission time based on the length of the transmission unit, or based on the interval length, or based on two of the maximum quantity of repetitions, the length of the transmission unit and the interval length.

Here, the length of the transmission period and the initial transmission time may be determined by using a predefined corresponding relationship. For example, the corresponding relationships between the length of the transmission period and the maximum quantity of repetitions, the length of the transmission unit are pre-defined. After determining the maximum quantity of repetitions and the length of the transmission unit, the length of the transmission period can be obtained based on the corresponding relationship.

In step 406, the terminal determines a repetition quantity set. The repetition quantity set includes a plurality of different quantities of repetitions.

The detailed process of this step is the same as that of step 305.

In step 407, the terminal determines the length of the transmission unit and the interval length.

In an implementation of the embodiment of the present disclosure, the terminal may determine the length of the transmission unit and the interval length in the same manner as the access network device.

In another implementation of the embodiment of the present disclosure, the access network device can configure at least one of the length of the transmission unit and the interval length to the terminal by configuring a parameter. The terminal can obtain at least one of the length of the transmission unit and the interval length by receiving the configuration parameter. The configuration parameter here may be the radio resource control signaling.

In step 408, the terminal determines the length of the transmission period and the initial transmission time.

In this implementation, similar to the access network device, the terminal determines the length of the transmission period and the initial transmission time by itself, instead of being sent by the access network device, which can save signaling overhead and reduce system power consumption.

In the process that the terminal determines the length of the transmission period and the initial transmission time, the parameter A and the parameter a can be obtained from the protocol, or can be configured to the terminal by the access network device together with the maximum quantity of repetitions Rmax.

In step 409, the access network device determines the initial position of each transmission period according to the initial transmission time and the length of the transmission period, and repeatedly sends the downlink control channel according to the quantity of repetitions, the length of the transmission unit and the interval length in each transmission period.

In this implementation, each period includes more than two transmission units. The total quantity of repeatedly transmitting the downlink control channel by more than two transmission units is the quantity of repetitions.

Figure 8:
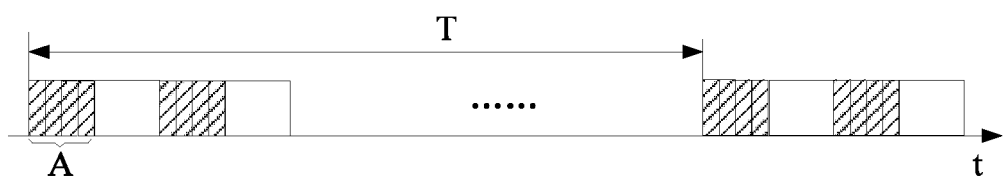
FIG. 8 is a schematic diagram of a transmission position provided by an embodiment of the present disclosure.

FIG. 8 is a schematic diagram of a transmission position provided by an embodiment of the present disclosure. Referring to FIG. 8, in each transmission period T, the resources used to transmit the downlink control channel may constitute at least two transmission units B, i.e., the shaded rectangle in the figure. Each shaded rectangle represents one transmission of the downlink control channel. The length between the transmission units B is the aforementioned interval length.

Step 410, the terminal determines the initial position of each transmission period according to the initial transmission time and the length of the transmission period, and according to the determined length of the transmission unit and the interval length, repeatedly receives the downlink control channel by using the plurality of quantities of repetitions successively in each transmission period, until the downlink control channel is correctly demodulated or all quantities of repetitions in the repetition quantity set are traversed.

For example, the terminal may perform repeated reception and demodulation by sequentially taking values from the repetition quantity set {⅛Rmax, ¼Rmax, ½Rmax, Rmax}. For example, in the transmission period, the downlink control channel is repeatedly received from the initial transmission time, and then the quantities in the repetition quantity set are demodulated according to a manner from small to large, until the downlink control channel is correctly demodulated or all quantities of repetitions in the repetition quantity set are traversed. The manner of taking values may also be from large to small, or in a random order, in addition to the manner of from small to large.

In this implementation, the quantity of repetitions is determined by the terminal itself, instead of being sent by the access network device, which can save signaling overhead and reduce system power consumption.

Figure 9:
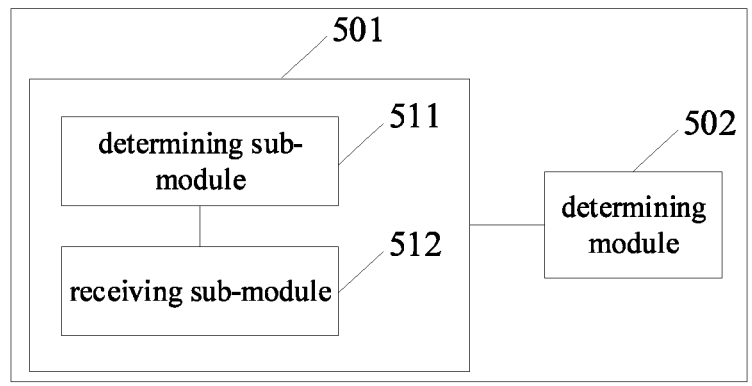
FIG. 9 is a schematic structural diagram of a downlink control channel transmission apparatus according to an illustrative embodiment.

FIG. 9 is a schematic structural diagram of a downlink control channel transmission apparatus according to an illustrative embodiment. The apparatus has the function of realizing the terminal in the above method embodiments. The function may be realized by the hardware, or realized by the hardware executing corresponding software. As shown in FIG. 9, the apparatus includes a receiving module 501.

The receiving module 501 is configured to repeatedly receive a downlink control channel on at least one transmission unit in a transmission period of the downlink control channel, wherein each transmission unit is configured to continuously and repeatedly transmit the downlink control channel at least twice.

Optionally, the receiving module 501 includes a determining sub-module 511, configured to determine a repetition quantity set, wherein the repetition quantity set includes a plurality of different quantities of repetitions, and a quantity of repeatedly transmitting the downlink control channel on the at least one transmission unit is one quantity in the repetition quantity set, a receiving sub-module 512, configured to repeatedly receive the downlink control channel by using the plurality of quantities of repetitions successively from an initial transmission time in each transmission period, until the downlink control channel is correctly demodulated or all quantities of repetitions in the repetition quantity set are traversed.

Optionally, when a number of the transmission units is greater than 1, an interval length between any adjacent transmission units is identical, the apparatus further includes a determining module 502, configured to determine a length of the transmission unit and the interval length.

Optionally, the determining module 502 is configured to: acquire a configuration signaling sent by an access network device, wherein the configuration signaling includes the length of the transmission unit, or acquire the length of the transmission unit configured in a protocol, or determine the length of the transmission unit based on a relationship between a maximum quantity of repetitions and a threshold, wherein the maximum quantity of repetitions is a maximum quantity of repetitions of the downlink control channel in each transmission period, or determine the length of the transmission unit based on a quantity of repetitions used currently.

Optionally, the determining module 502 is configured to: acquire configuration signaling sent by an access network device, wherein the configuration signaling includes the interval length, or acquire the interval length configured in a protocol, or determine the interval length based on the length of the transmission unit, or determine the interval length based on a maximum quantity of repetitions, wherein the maximum quantity of repetitions is a maximum quantity of repetitions of the downlink control channel in each transmission period.

Optionally, the determining module 502 is further configured to determine a length of the transmission period, the receiving module 501 is configured to periodically receive the downlink control channel based on the length of the transmission period.

Optionally, the determining module 502 is configured to determine the length of the transmission period based on at least one of a length of the transmission unit, the interval length, and the maximum quantity of repetitions, wherein the maximum quantity of repetitions is a maximum quantity of repetitions of the downlink control channel in each transmission period.

Optionally, the determining module 502 is configured to determine an initial transmission time, the receiving module 501 is configured to receive the downlink control channel from the initial transmission time in each transmission period.

Optionally, the determining module 502 is configured to determine the initial transmission time based on at least one of a length of the transmission unit, the interval length, and the maximum quantity of repetitions, wherein the maximum quantity of repetitions is a maximum quantity of repetitions of the downlink control channel in each transmission period.

Optionally, the determining module 502 is configured to acquire a maximum quantity of repetitions, wherein the maximum quantity of repetitions is a maximum quantity of repetitions of the downlink control channel in each transmission period, determining the repetition quantity set based on the maximum quantity of repetitions, wherein a maximum value in the repetition quantity set is the maximum quantity of repetitions.

Optionally, the receiving module 501 is configured to receive a radio resource control signaling, wherein the radio resource control signaling includes the maximum quantity of repetitions.

Figure 10:
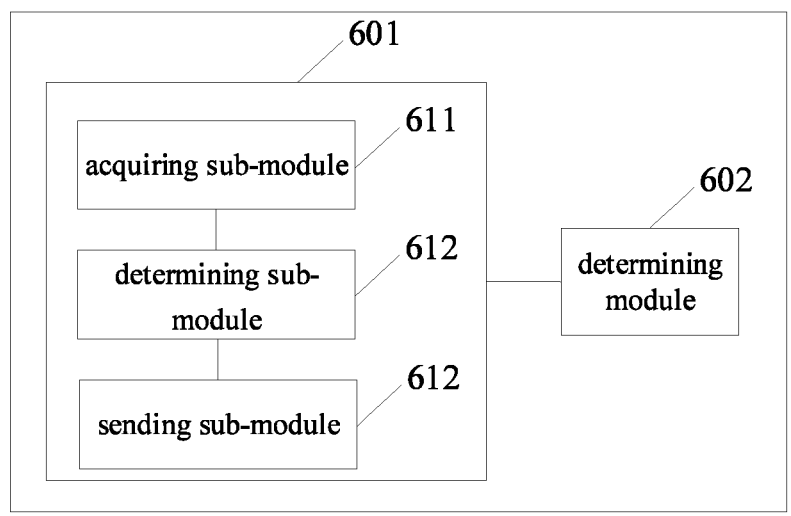
FIG. 10 is a schematic structural diagram of a downlink control channel transmission apparatus according to an illustrative embodiment.

FIG. 10 is a schematic structural diagram of a downlink control channel transmission apparatus according to an illustrative embodiment. The apparatus has the function of realizing the access network device in the above method embodiments. The function may be realized by the hardware, or realized by the hardware executing corresponding software. As shown in FIG. 10, the apparatus includes a sending module 601.

The sending module 601 is configured to repeatedly send a downlink control channel on at least one transmission unit in a transmission period of the downlink control channel, wherein each transmission unit is configured to continuously transmit the downlink control channel at least twice.

Optionally, the sending module 601 includes an acquiring sub-module 611, configured to acquire channel condition information of a terminal, a determining sub-module 612, configured to determine a quantity of repetitions based on channel condition information of the terminal, a sending sub-module 613, configured to repeatedly send the downlink control channel based on the quantity of repetitions, wherein a quantity of repeatedly transmitting the downlink control channel on the at least one transmission unit is the quantity of repetitions.

Optionally, when a number of the transmission units is greater than 1, an interval length between any adjacent transmission units is identical, the apparatus may further include a determining module 602, configured to determine a length of the transmission unit and the interval length.

Optionally, the determining module 602 is configured to: acquire the length of the transmission unit configured in a protocol, or determine the length of the transmission unit based on a relationship between a maximum quantity of repetitions and a threshold, wherein the maximum quantity of repetitions is a maximum quantity of repetitions of the downlink control channel in each transmission period, or determine the length of the transmission unit based on a quantity of repetitions used in a current transmission.

Optionally, the determining module 602 is configured to acquire the interval length configured in a protocol; or,
determine the interval length based on the length of the transmission unit; or,
determine the interval length based on a maximum quantity of repetitions, wherein the maximum quantity of repetitions is a maximum quantity of repetitions of the downlink control channel in each transmission period.

Optionally, the sending module 601 is configured to send at least one of the length of the transmission unit and the interval length by using a configuration signaling.

Optionally, the determining module 602 is configured to determine a length of the transmission period, the sending module 601 is configured to periodically send the downlink control channel based on the length of the transmission period.

Optionally, the determining module 602 is configured to determine the length of the transmission period based on at least one of a length of the transmission unit, the interval length, and the maximum quantity of repetitions, wherein the maximum quantity of repetitions is a maximum quantity of repetitions of the downlink control channel in each transmission period.

Optionally, the determining module 602 is configured to determine an initial transmission time, the sending module 601 is configured to send the downlink control channel from the initial transmission time in each transmission period.

Optionally, the determining module 602 is configured to determine the initial transmission time based on at least one of a length of the transmission unit, the interval length, and the maximum quantity of repetitions, wherein the maximum quantity of repetitions is a maximum quantity of repetitions of the downlink control channel in each transmission period.

Optionally, the sending module 601 is configured to send a radio resource control signaling, wherein the radio resource control signaling includes a maximum quantity of repetitions, the maximum quantity of repetitions is a maximum quantity of repetitions of the downlink control channel in each transmission period.

Figure 11:
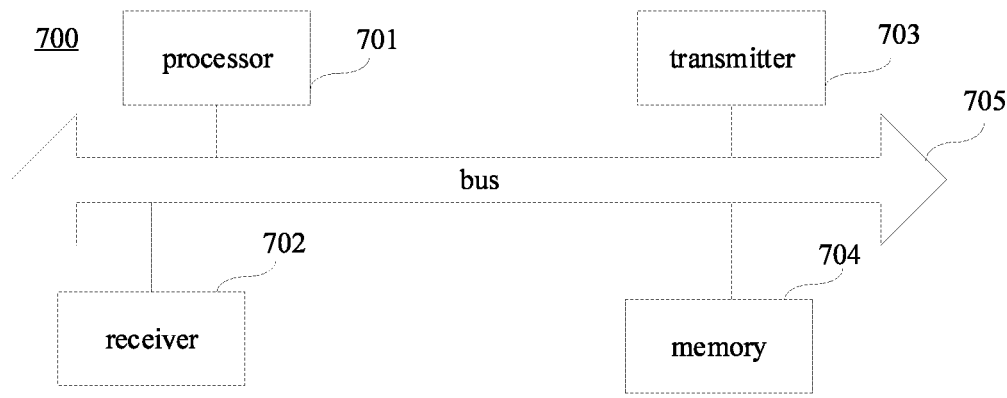
FIG. 11 is a block diagram of a terminal according to an illustrative embodiment.

FIG. 11 is a block diagram of a terminal 700 according to an illustrative embodiment. The terminal 700 may include: a processor 701, a receiver 702, a transmitter 703, a memory 704 and a bus 705.

The processor 701 includes one or more processing cores. The processor 701 executes various functional applications and information processing by running software programs and modules.

The receiver 702 and the transmitter 703 may be implemented as a communication component, which may be a communication chip.

The memory 704 is connected to a processor 701 via a bus 705.

The memory 704 may be configured to store at least one instruction. The processor 701 is configured to execute the at least one instruction, so as to implement various steps in the foregoing method embodiments.

In addition, the memory 704 may be implemented by any type or combination of volatile or non-volatile storage devices including, but not limited to, magnetic or optical disks, electrically erasable programmable Read Only Memory (EEPROM), Erasable Programmable Read Only Memory (EPROM), Static Anytime Access Memory (SRAM), Read Only Memory (ROM), Magnetic Memory, Flash Memory, Programmable Read Only Memory (PROM).

In an illustrative embodiment, a computer-readable storage medium is also provided, wherein the computer-readable storage medium stores at least one instruction, at least one section of program, code set or instruction set. The at least one instruction, the at least one section of the program, the code set or the instruction set is loaded and executed by the processor to implement the downlink control channel transmission method provided by each of the foregoing method embodiments.

Figure 12:
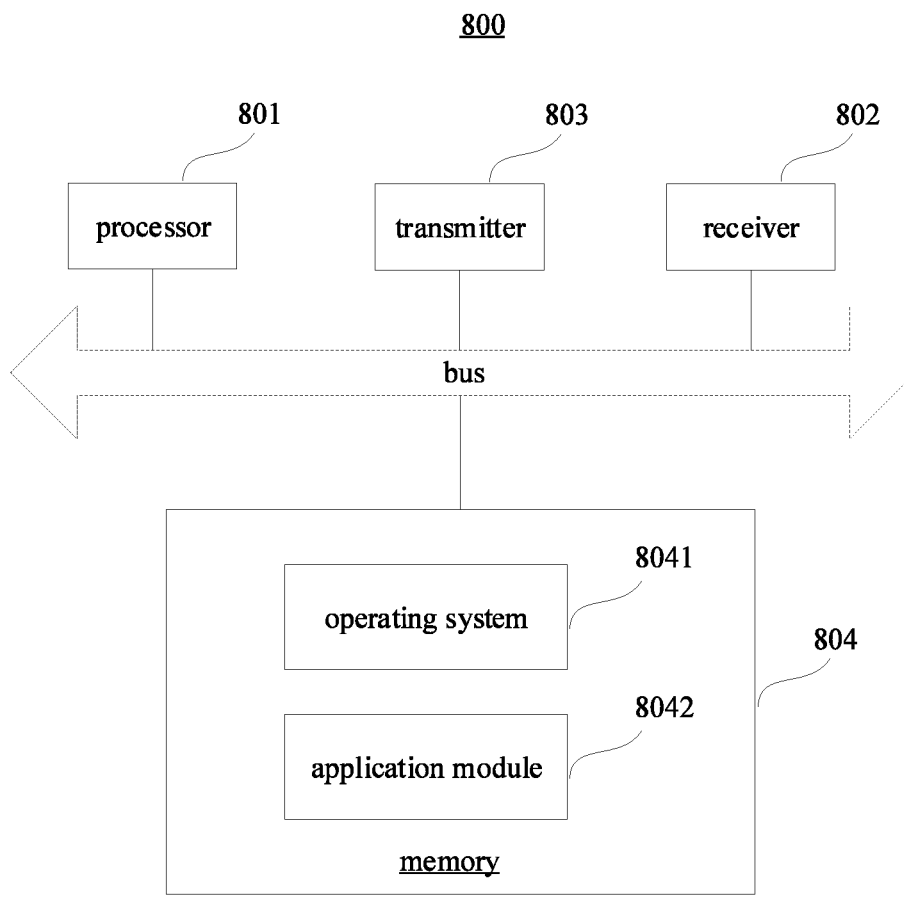
FIG. 12 is a block diagram of an access network device according to an illustrative embodiment.

FIG. 12 is a block diagram of an access network device 800 according to an illustrative embodiment. The access network device 800 may include: a processor 801, a receiver 802, a transmitter 803 and a memory 804. The receiver 802, the transmitter 803 and the memory 804 are respectively connected to the processor 801 through a bus.

The processor 801 includes one or more processing cores. The processor 801 executes the method performed by the access network device in the downlink control channel transmission method provided by the embodiment of the present disclosure by running software programs and modules. The memory 804 may be used to store software programs and modules. Specifically, the memory 804 can store the operating system 8041 and an application module 8042 required for at least one function. The receiver 802 is used for receiving communication data sent by other devices, and the transmitter 803 is used for sending communication data to other devices.

In an illustrative embodiment, a non-transitory computer-readable storage medium is also provided, wherein the computer-readable storage medium stores at least one instruction, at least one section of program, code set or instruction set. The at least one instruction, the at least one section of the program, the code set or the instruction set is loaded and executed by the processor to implement the downlink control channel transmission method provided by each of the foregoing method embodiments.

An illustrative embodiment of the present disclosure further provides a downlink control channel transmission system. The downlink control channel transmission system includes a terminal and an access network device. The terminal is the terminal provided by the embodiment shown in FIG. 11. The access network device is the access network device provided in the embodiment shown in FIG. 12.

According to an aspect of the embodiments of the present disclosure, there is provided a downlink control channel transmission method, including repeatedly receiving a downlink control channel on at least one transmission unit in a transmission period of the downlink control channel, wherein each transmission unit is configured to continuously and repeatedly transmit the downlink control channel at least twice.

In an implementation of embodiments of the present disclosure, repeatedly receiving a downlink control channel on at least one transmission unit in a transmission period of the downlink control channel includes determining a repetition quantity set, wherein the repetition quantity set includes a plurality of different quantities of repetitions, and a quantity of repeatedly transmitting the downlink control channel on the at least one transmission unit is one quantity in the repetition quantity set, in each transmission period, repeatedly receiving the downlink control channel by using the plurality of quantities of repetitions successively from an initial transmission time, until the downlink control channel is correctly demodulated or all quantities of repetitions in the repetition quantity set are traversed.

In an implementation of embodiments of the present disclosure, when a number of the transmission units is greater than 1, an interval length between any adjacent transmission units is identical, the method further includes determining a length of the transmission unit and the interval length.

In an implementation of embodiments of the present disclosure, determining the length of the transmission unit includes acquiring a configuration signaling sent by an access network device, wherein the configuration signaling includes the length of the transmission unit, or acquiring the length of the transmission unit configured in a protocol; or, determining the length of the transmission unit based on a relationship between a maximum quantity of repetitions and a threshold, wherein the maximum quantity of repetitions is a maximum quantity of repetitions of the downlink control channel in each transmission period, or determining the length of the transmission unit based on a quantity of repetitions used in a current transmission.

In an implementation of embodiments of the present disclosure, determining the interval length includes acquiring a configuration signaling sent by an access network device, wherein the configuration signaling includes the interval length, or acquiring the interval length configured in a protocol, or determining the interval length based on the length of the transmission unit, or determining the interval length based on a maximum quantity of repetitions, wherein the maximum quantity of repetitions is a maximum quantity of repetitions of the downlink control channel in each transmission period.

In an implementation of embodiments of the present disclosure, the method further includes determining a length of the transmission period, periodically receiving the downlink control channel based on the length of the transmission period.

In an implementation of embodiments of the present disclosure, determining the length of the transmission period includes determining the length of the transmission period based on at least one of a length of the transmission unit, the interval length, and the maximum quantity of repetitions, wherein the maximum quantity of repetitions is a maximum quantity of repetitions of the downlink control channel in each transmission period.

In an implementation of embodiments of the present disclosure, the method further includes determining an initial transmission time, in each transmission period, receiving the downlink control channel from the initial transmission time.

In an implementation of embodiments of the present disclosure, determining the initial transmission time includes determining the initial transmission time based on at least one of a length of the transmission unit, the interval length, and the maximum quantity of repetitions, wherein the maximum quantity of repetitions is a maximum quantity of repetitions of the downlink control channel in each transmission period.

In an implementation of embodiments of the present disclosure, determining the repetition quantity set includes acquiring a maximum quantity of repetitions, wherein the maximum quantity of repetitions is a maximum quantity of repetitions of the downlink control channel in each transmission period, determining the repetition quantity set based on the maximum quantity of repetitions, wherein a maximum value in the repetition quantity set is the maximum quantity of repetitions.

In an implementation of embodiments of the present disclosure, acquiring the maximum quantity of repetitions includes receiving a radio resource control signaling, wherein the radio resource control signaling includes the maximum quantity of repetitions.

According to an aspect of the embodiments of the present disclosure, there is provided a downlink control channel transmission method, including repeatedly sending a downlink control channel on at least one transmission unit in a transmission period of the downlink control channel, wherein each transmission unit is configured to continuously transmit the downlink control channel at least twice.

In an implementation of embodiments of the present disclosure, repeatedly sending a downlink control channel on at least one transmission unit in a transmission period of the downlink control channel includes acquiring channel condition information of a terminal;

determining a quantity of repetitions based on channel condition information of the terminal, repeatedly sending the downlink control channel based on the quantity of repetitions, wherein a quantity of repeatedly transmitting the downlink control channel on the at least one transmission unit is the quantity of repetitions.

In an implementation of embodiments of the present disclosure, when a number of the transmission units is greater than 1, an interval length between any adjacent transmission units is identical, the method further includes determining a length of the transmission unit and the interval length.

In an implementation of embodiments of the present disclosure, determining the length of the transmission unit includes acquiring the length of the transmission unit configured in a protocol, or determining the length of the transmission unit based on a relationship between a maximum quantity of repetitions and a threshold, wherein the maximum quantity of repetitions is a maximum quantity of repetitions of the downlink control channel in each transmission period, or determining the length of the transmission unit based on a quantity of repetitions used in a current transmission.

In an implementation of embodiments of the present disclosure, determining the interval length includes acquiring the interval length configured in a protocol, or determining the interval length based on the length of the transmission unit, or determining the interval length based on a maximum quantity of repetitions, wherein the maximum quantity of repetitions is a maximum quantity of repetitions of the downlink control channel in each transmission period.

In an implementation of embodiments of the present disclosure, the method further includes sending at least one of the length of the transmission unit and the interval length by using a configuration signaling.

In an implementation of embodiments of the present disclosure, the method further includes determining a length of the transmission period, periodically sending the downlink control channel based on the length of the transmission period.

In an implementation of embodiments of the present disclosure, determining the length of the transmission period includes determining the length of the transmission period based on at least one of a length of the transmission unit, the interval length, and the maximum quantity of repetitions, wherein the maximum quantity of repetitions is a maximum quantity of repetitions of the downlink control channel in each transmission period.

In an implementation of embodiments of the present disclosure, the method further includes determining an initial transmission time, in each transmission period, sending the downlink control channel from the initial transmission time.

In an implementation of embodiments of the present disclosure, determining the initial transmission time includes determining the initial transmission time based on at least one of a length of the transmission unit, the interval length, and the maximum quantity of repetitions, wherein the maximum quantity of repetitions is a maximum quantity of repetitions of the downlink control channel in each transmission period.

In an implementation of embodiments of the present disclosure, the method further includes sending a radio resource control signaling, wherein the radio resource control signaling includes a maximum quantity of repetitions, the maximum quantity of repetitions is a maximum quantity of repetitions of the downlink control channel in each transmission period.

According to an aspect of the embodiments of the present disclosure, there is provided a downlink control channel transmission apparatus, including a receiving module, configured to repeatedly receive a downlink control channel on at least one transmission unit in a transmission period of the downlink control channel, wherein each transmission unit is configured to continuously and repeatedly transmit the downlink control channel at least twice.

According to an aspect of the embodiments of the present disclosure, there is provided a downlink control channel transmission apparatus, including a sending module, configured to repeatedly send a downlink control channel on at least one transmission unit in a transmission period of the downlink control channel, wherein each transmission unit is configured to continuously transmit the downlink control channel at least twice.

According to another aspect of the embodiments of the present disclosure, there is provided a terminal, including: a processor; and a memory for storing instructions executable by the processor, wherein, the processor is configured to load and execute the executable instructions to implement the downlink control channel transmission methods described above.

According to another aspect of the embodiments of the present disclosure, there is provided an access network device, including: a processor; and a memory for storing instructions executable by the processor, wherein, the processor is configured to load and execute the executable instructions to implement the downlink control channel transmission methods described above.

According to another aspect of the embodiments of the present disclosure, there is provided a computer-readable storage medium, wherein instructions in the computer-readable storage medium enable to perform the downlink control channel transmission methods described above, when executed by a processor.

Other embodiments of the present disclosure will readily occur to those skilled in the art upon consideration of the specification and practice of the disclosure disclosed herein. This application is intended to cover any variations, uses, or adaptations of the present disclosure that follow the general principles of the present disclosure and include common knowledge or techniques in the technical field not disclosed by the present disclosure. The specification and embodiments are regarded as exemplary only, with the true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for downlink control channel transmission, comprising:
   repeatedly receiving a downlink control channel on at least one transmission unit in a transmission period of the downlink control channel, wherein each transmission unit is configured to continuously and repeatedly transmit the downlink control channel at least twice,
   wherein when a number of the transmission units is greater than 1, an interval length between any adjacent transmission units is identical, the method further comprises:
   determining a length of the transmission unit and the interval length.

2. The method according to claim 1, wherein repeatedly receiving a downlink control channel on at least one transmission unit in a transmission period of the downlink control channel comprises:
   determining a repetition quantity set, wherein the repetition quantity set comprises a plurality of different quantities of repetitions, and a quantity of repeatedly transmitting the downlink control channel on the at least one transmission unit is one quantity in the repetition quantity set;
   in each transmission period, repeatedly receiving the downlink control channel by using the plurality of quantities of repetitions successively from an initial transmission time, until the downlink control channel is correctly demodulated or all quantities of repetitions in the repetition quantity set are traversed.

3. The method according to claim 1, wherein determining the length of the transmission unit comprises at least one of the following actions:
   acquiring a configuration signaling sent by an access network device, wherein the configuration signaling comprises the length of the transmission unit;
   acquiring the length of the transmission unit configured in a protocol;
   determining the length of the transmission unit based on a relationship between a maximum quantity of repetitions and a threshold, wherein the maximum quantity of repetitions is a maximum quantity of repetitions of the downlink control channel in each transmission period; and determining the length of the transmission unit based on a quantity of repetitions used currently.

4. The method according to claim 1, wherein determining the interval length comprises at least one of following actions:

acquiring a configuration signaling sent by an access network device, wherein the configuration signaling comprises the interval length;

acquiring the interval length configured in a protocol;

determining the interval length based on the length of the transmission unit; and determining the interval length based on a maximum quantity of repetitions, wherein the maximum quantity of repetitions is a maximum quantity of repetitions of the downlink control channel in each transmission period.

5. The method according to claim 1, further comprising:
determining a length of the transmission period;
periodically receiving the downlink control channel based on the length of the transmission period.

6. The method according to claim 5, wherein determining the length of the transmission period comprises:

determining the length of the transmission period based on at least one of a length of the transmission unit, the interval length, and the maximum quantity of repetitions, wherein the maximum quantity of repetitions is a maximum quantity of repetitions of the downlink control channel in each transmission period.

7. The method according to claim 1, further comprising:
determining an initial transmission time;
in each transmission period, receiving the downlink control channel from the initial transmission time.

8. The method according to claim 7, wherein determining the initial transmission time comprises:

determining the initial transmission time based on at least one of a length of the transmission unit, the interval length, and the maximum quantity of repetitions, wherein the maximum quantity of repetitions is a maximum quantity of repetitions of the downlink control channel in each transmission period.

9. The method according to claim 2, wherein determining the repetition quantity set comprises:

acquiring a maximum quantity of repetitions, wherein the maximum quantity of repetitions is a maximum quantity of repetitions of the downlink control channel in each transmission period;

determining the repetition quantity set based on the maximum quantity of repetitions, wherein a maximum value in the repetition quantity set is the maximum quantity of repetitions.

10. A downlink control channel transmission method, comprising:

repeatedly sending a downlink control channel on at least one transmission unit in a transmission period of the downlink control channel, wherein each transmission unit is configured to continuously transmit the downlink control channel at least twice, wherein when a number of the transmission units is greater than 1, an interval length between any adjacent transmission units is identical, the method further comprises:

determining a length of the transmission unit and the interval length.

11. The method according to claim 10, wherein repeatedly sending a downlink control channel on at least one transmission unit in a transmission period of the downlink control channel comprises:

acquiring channel condition information of a terminal;

determining a quantity of repetitions based on channel condition information of the terminal;

repeatedly sending the downlink control channel based on the quantity of repetitions, wherein a quantity of repeatedly transmitting the downlink control channel on the at least one transmission unit is the quantity of repetitions.

12. The method of claim 10, wherein determining the length of the transmission unit comprises at least one of following actions:

acquiring the length of the transmission unit configured in a protocol;

determining the length of the transmission unit based on a relationship between a maximum quantity of repetitions and a threshold, wherein the maximum quantity of repetitions is a maximum quantity of repetitions of the downlink control channel in each transmission period; and determining the length of the transmission unit based on a quantity of repetitions used in a current transmission.

13. The method according to claim 10, wherein determining the interval length comprises at least one of following actions:

acquiring the interval length configured in a protocol;

determining the interval length based on the length of the transmission unit; and determining the interval length based on a maximum quantity of repetitions, wherein the maximum quantity of repetitions is a maximum quantity of repetitions of the downlink control channel in each transmission period.

14. The method according to claim 10, further comprising:

sending at least one of the length of the transmission unit and the interval length by using a configuration signaling.

15. The method according to claim 10, further comprising:

determining a length of the transmission period;
periodically sending the downlink control channel based on the length of the transmission period.

16. The method according to claim 10, further comprising:

determining an initial transmission time;
in each transmission period, sending the downlink control channel from the initial transmission time.

17. A terminal, comprising:
a processor; and
a memory for storing instructions executable by the processor, wherein, the processor is configured to load and execute the executable instructions to repeatedly receive a downlink control channel on at least one transmission unit in a transmission period of the downlink control channel, wherein each transmission unit is configured to continuously and repeatedly transmit the downlink control channel at least twice, wherein when a number of the transmission units is greater than 1, an interval length between any adjacent transmission units is identical, the processor is further configured to:

determine a length of the transmission unit and the interval length.

18. An access network device, comprising:
a processor; and
a memory for storing instructions executable by the processor,
wherein, the processor is configured to load and execute the executable instructions to implement the downlink control channel transmission method according to claim 10.

* * * * *